United States Patent [19]

Hurtado et al.

[11] Patent Number: 5,298,467
[45] Date of Patent: Mar. 29, 1994

[54] GRANULATED PRODUCT COMPOSED OF SILICON CARBIDE POWDER AND SILICON CARBIDE CERAMIC FORMED THEREFROM

[75] Inventors: Antonio M. Hurtado, Aachen; Hans R. Dose, Bürstadt; Zeynel Alkan, Aachen; Wolfgang Habel, Duesseldorf; Christoph Nover, Gladbeck; Hans Meyer, Wunstorf, all of Fed. Rep. of Germany

[73] Assignee: Solvay Deutschland GmbH, Hanover, Fed. Rep. of Germany

[21] Appl. No.: 928,473

[22] Filed: Aug. 12, 1992

[30] Foreign Application Priority Data

Aug. 19, 1991 [DE] Fed. Rep. of Germany ....... 4127354

[51] Int. Cl.$^5$ .............................................. C04B 35/56
[52] U.S. Cl. ...................................... 501/90; 501/88; 423/345
[58] Field of Search .................. 501/88, 90; 264/63, 264/65; 423/345

[56] References Cited

U.S. PATENT DOCUMENTS

| | | | |
|---|---|---|---|
| 4,105,455 | 8/1978 | Kogu et al. | 423/345 |
| 4,117,057 | 9/1978 | Yajima et al. | 501/88 |
| 4,122,139 | 10/1978 | Yajima et al. | 264/44 |
| 4,154,787 | 5/1979 | Brown | 501/88 |
| 4,237,085 | 12/1980 | Smoak | 501/88 |
| 4,336,215 | 6/1982 | Yajima et al. | 501/88 |
| 4,551,436 | 11/1985 | Johnson et al. | 501/88 |
| 5,087,685 | .2/1992 | Sartori et al. | 528/25 |

FOREIGN PATENT DOCUMENTS

| | | |
|---|---|---|
| 435494 | 7/1991 | European Pat. Off. . |
| 3243570 | 5/1988 | Fed. Rep. of Germany . |
| 4026127 | 8/1990 | Fed. Rep. of Germany . |
| 4030529 | 4/1992 | Fed. Rep. of Germany . |
| 4102315 | 7/1992 | Fed. Rep. of Germany . |
| 0166374 | 10/1982 | Japan ..................... 501/88 |
| 1091076 | 5/1986 | Japan ..................... 501/88 |

OTHER PUBLICATIONS

"High Pressure Self–Combustion Sintering of Silicon Carbide" Yamada et al. Am. Ceram. Soc. Bull., 64 (2) 319–21 (1985).

Hurtado et al., "Production of Pressureless-Sintered SiC-base Materials using Polycarbosilane as Binder", cfi/Ber. DKG, vol. 68, No. 12, pp. 578–583 (1991).

Yajima, "Special Heat-Resisting Materials from Organometallic Polymers", *Ceramic Bulletin*, vol. 62, No. 8, pp. 893–898 (1983).

Mizrah et al., "Pressureless Sintering of α-Sic", *Powder Metallurgy International*, vol. 16, No. 5, pp. 217–220 (1984).

Kriegesmann et al, "Beitrag zum Sintermechanismus von Silliciumcarbid", *Keramasiche Zeitschrift*, vol. 38, No. 10, pp. 606–608 (1986).

*Primary Examiner*—Mark L. Bell
*Assistant Examiner*—Paul Marcantoni
*Attorney, Agent, or Firm*—Evenson, McKeown, Edwards & Lenahan

[57] ABSTRACT

A binder-containing granulated silicon carbide products for the manufacture of highly dense silicon carbide ceramic products and the SiC ceramic products which can be made from the novel granulated silicon carbide products, especially highly dense SiC high-performance pressurelessly sintered ceramics.

25 Claims, No Drawings

GRANULATED PRODUCT COMPOSED OF SILICON CARBIDE POWDER AND SILICON CARBIDE CERAMIC FORMED THEREFROM

BACKGROUND OF THE INVENTION

This invention relates to novel, binder-containing granulated silicon carbide products for use in manufacturing highly dense silicon carbide ceramic objects and to silicon carbide ceramic objects produced using the novel granulated silicon carbide products.

Due to its chemical and physical properties, silicon carbide is an outstanding material for many sectors of industry, for example for the semiconductor industry, the automotive industry, for chemical plant engineering, for the machine tool industry, etc. The properties of silicon carbide include high resistance to oxidation and corrosion, high thermal conductivity at high temperatures, a low coefficient of thermal expansion, high thermal shock resistance, heat resistance, hardness and abrasion resistance. It is particularly suitable for manufacturing highly dense articles for many industrial applications, for example highly dense sintered articles.

Various processes are known for producing sintered articles. The oldest process is hot-pressing, in which SiC powder is mixed with small quantities of additives which promote sintering, for example boron or aluminium, and sintered in graphite molds under mechanical pressure at high temperatures of up to about 2000° C. under a protective gas atmosphere. A further process is pressureless sintering, in which submicronic silicon carbide powder, likewise with added sintering aid, is cold-pressed and then sintered pressureless at temperatures of up to 2000° C. in vacuo or under a protective gas atmosphere. A third process is hot-isostatic pressing of SiC. For this purpose, an article cold-formed from silicon carbide is enclosed gas-tight in vacuo in an envelope of silica glass or refractory metal and compacted under a high gas pressure at temperatures of up to 2000° C. In addition, hot-isostatic redensification of silicon carbide sintered pressureless is also possible.

The sintering of silicon carbide alone, however, frequently leads to sintered articles having a high porosity and a density far below the theoretical density of silicon carbide (3.21 g/cm$^3$). Such porous sintered silicon carbide articles are highly susceptible to oxidation, especially at elevated temperatures, and their mechanical strength is low. In the prior art, the production of sintered silicon carbide articles is therefore carried out with added sintering aids and/or binders, since sintered articles having a better density and better oxidation resistance can be obtained in this way. Sintering aids which are used in many cases include a few per cent of aluminium oxide, metal oxides such as thorium oxide, yttrium oxide, lanthanum oxide or cerium oxide, boron, metallic silicon, tungsten carbide or the like. Examples of binders used in the prior art include organic resins such as phenolic resins or furfuryl resins, organic polymers such as, for example, methylcellulose, polyvinyl alcohol, high-molecular weight organosilicon compounds, namely organopolysiloxanes, organopolyborosiloxanes and polysilanes. The use of oxidic sintering aids or of the above types of binders for the manufacture of high-performance ceramics from silicon carbide is disadvantageous, however, since it is impossible to prevent oxidic and other impurities (for example decomposition products of the binder) from remaining in the resulting sintered articles. Oxidic impurities are especially undesirable in SiC-based high-performance ceramics. Moreover, even if the aforementioned silicon-organic compounds are used as binders, only ceramic products are obtained whose flexural breaking strength is insufficient for high-performance ceramics. Like the nature of the silicon carbide powder used, the additives which are added, especially the binders, also exert a decisive influence on the ceramic product. Therefore, there remains a need for granulated silicon carbide products having a defined composition and defined properties, which facilitate the manufacture of highly pure and highly dense high-performance ceramics from silicon carbide.

SUMMARY OF THE INVENTION

It is the object of the invention to provide a granular silicon carbide material useful to produce silicon carbide objects having low porosity and high density.

Another object of the invention is to provide a granular silicon carbide material which can be used to produce silicon carbide objects having good oxidation resistance.

A further object of the invention is to provide a granular silicon carbide material for manufacturing high performance silicon carbide objects having good mechanical strength.

It is also an object of the invention to provide silicon carbide ceramic objects which contain low levels of impurities, particularly oxidic impurities which might adversely affect the character of the ceramic object.

These and other objects of the invention are achieved by providing a granulated silicon carbide powder product consisting essentially of the following homogeneously distributed constituents: (a) 67 to 95% by weight SiC powder; (b) 3 to 30% by weight binder based on (b1) a directly synthesized polycarbosilane or polycarbosilane mixture and/or (b2) a directly synthesized polyborocarbosilane or polyborocarbosilane mixture, wherein at least 20 mole % of the carbosilane substituents in the binder are phenyl substituents and, in the case of binders containing polyborocarbosilane, the proportion of the polyborocarbosilane is such that the boron content of the granulated product is 0.1 to 3.0% by weight, and (c) from 0 to 3.0% by weight of an oxygen-free sintering aid.

DETAILED DESCRIPTION OF PREFERRED EMBODIMENTS

According to the invention, it has now been found that a granulated product based on silicon carbide powder, which is essentially composed of the following constituents, homogeneously distributed in the granulated product:
(a) 67 to 95% by weight of SiC powder,
(b) 3 to 30% by weight of a binder based on
 (b1) a directly synthesized polycarbosilane or polycarbosilane mixture and/or
 (b2) a directly synthesized polyborocarbosilane or polyborocarbosilane mixture,
 at least 20 mole % of the carbosilane substituents in the binder being phenyl substituents and, in the case of binders containing polyborocarbosilane, the proportion of the polyborocarbosilane being such that the boron content of the granulated product is 0.1 to 3.0% by weight, preferably 0.2 to 1.0% by weight, and (c) especially in the case of binders with only polycarbosilane according to (b1), up to 3.0% by weight of an oxygen-free sintering aid, is outstandingly suitable for manufacturing high-performance ceramics based on silicon carbide. Granulated products whose granulated particles have a particle diameter of less than 0.6 mm, preferably less than 0.3 mm, are especially advantageous. Preferably they are greater than 0.02 mm.

The invention thus relates to a granulated silicon carbide product of uniform composition, which contains as constituents a special binder based on selected polycarbosilanes and/or polyborocarbosilanes and, optionally, a sintering aid. The SiC powder contained in the granulated SiC product according to the invention can in principle be any silicon carbide powder, for example α-silicon carbide or β-silicon carbide. The commercially available, finely disperse α-silicon carbide is preferred, especially that produced by the Acheson process. According to this process a mixture of pure quartz sand (for example highly pure $SiO_2$ with more than 99.8% of $SiO_2$) and low-ash coke (for example petroleum coke, gas retort carbon, or the like) with additions of sawdust and of common salt is converted in an electric resistance furnace at about 2500° C. into silicon carbide. The purity of the resulting silicon carbide is assessed according to the color. Directly on the electrode, a material of light green color and a purity of 99.8% is formed. At 99.5% purity, the color is dark green, and it becomes black at 99% purity and below. At an SiC purity of less than 90%, the color becomes grey. The silicon carbide produced according to the Acheson process is obtained in large blocks which are comminuted by crushing and grinding in a known manner to give powders having suitable particle sizes. In general, SiC powders having an average particle size of less than 5 μm, and especially less than 1 μm, down to 200 nm and finer, that is to say ultra-fine α-SiC, are preferred.

SiC starting materials obtained by other processes can also be present as SiC powders in the granulated product. For example, silicon carbide is also produced in the state of the art by plasma arc synthesis, by continuous fusion in an induction furnace, by reactions in an inert CO atmosphere, by decomposition of polycarbosilanes and also via chemical vapor deposition (CVD) processes. Preferably, the granulated SiC product according to the invention contains ultra-fine silicon carbide powder, especially such an SiC powder having a specific surface area from 10 to 20 m²/g, measured according to BET; the tap density is 0.75 to 1.0 g/cm³; the pH value is 6 to 7 (90 g of SiC boiled up in 100 ml of deionized $H_2O$; measurement after cooling to room temperature). The impurities in the silicon carbide powder are very slight, for example the free carbon content is below about 0.4%, the free silicon content is below about 0.12%, the oxygen content is below about 0.8%, and the content of individual metals such as aluminium, iron, titanium, sodium, tungsten, cobalt, magnesium or calcium is below 0.05% in each case, while the total content of these metals is below about 0.15%.

A further component of the granulated product according to the invention, based on silicon carbide powder, is the binder based on polycarbosilanes and/or polyborocarbosilanes. In the polycarbosilanes and polyborocarbosilanes of the binder according to the invention, a proportion of at least 20 mole % of the carbosilane substituents must be phenyl substituents. In preferred embodiments of the invention at least 50 mole %, more preferably at least 65 mole %, and particularly preferably at least 70 mole %, of the carbosilane substituents are phenyl substituents. As used herein, the term "carbosilane substituents" refers only to the Si substituents and/or B substituents of the polycarbosilanes or polyborocarbosilanes respectively, of the binder, which, as monovalent radicals, are linked to only one Si atom or B atom of the polycarbosilane or polyborocarbosilane, respectively. The term "carbosilane substituents" is not intended to include the divalent groups which, with the Si atoms and B atoms, form the polycarbosilane or polyborocarbosilane backbone. Carbosilane substituents within the meaning of the above definition therefore include, for example, the radicals Ph, R, R', R", $R^1$, $R^2$, $R^3$ and Me, which are described in further detail hereinafter in conjunction with preferred embodiments of the polycarbosilanes and/or polyborocarbosilanes of the binder according to the invention. The chain-forming divalent groups A, which with the silicon atoms and/or boron atoms form the polycarbosilane backbone or polyborocarbosilane backbone, are regarded as backbone groups of the polycarbosilane or polyborocarbosilane and are not included with the carbosilane substituents within the meaning of the above definition, i.e. they are not counted among the Si substituents or B substituents.

In a first variant (b1) of the invention, the binder is a directly synthesized polycarbosilane or a mixture of directly synthesized polycarbosilanes in which at least 20 mole % of the Si substituents in the polycarbosilane or in the polycarbosilane mixture are phenyl substituents. These polycarbosilanes of the binder are polymers having a backbone structure consisting of the elements carbon and silicon in which chain-forming Si groups and hydrocarbon groups may be present in alternation or in a random distribution. In a preferred granulated product, the polycarbosilanes of the binder have a backbone consisting essentially of the structural units of the formulae —A— (A) and —Si($R^1$)($R^2$)— (B), in which $R^1$ and $R^2$ represent hydrogen, alkyl, cycloalkyl or phenyl; A represents an alkylene radical having 1 to 6 carbon atoms, particularly methylene, and the structural units of the formulae (A) and (B) are present in the polycarbosilane in a ratio of about 1:1.

The backbone structure of polycarbosilanes of alternating build-up is essentially chain-like or linear and consists, for example, of recurring structural units of the formulae

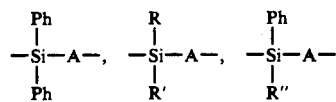

or of a combination thereof. Polycarbosilanes having a random distribution of the groups (A) and (B) are also suitable as binders. In such polycarbosilanes, the groups (A) and (B) are likewise present in a ratio of about 1:1. However, due to the random distribution, the polycarbosilane chain has a backbone in which blocks of two or more structural units —A—, of two or more structural units —Si($R^1R^2$)— and also of structural units —A— Si($R^1R^2$)— can be present. Such polycarbosilanes can be obtained in the direct synthesis. The proportion of structural units with phenyl substituents must be such that the 20% minimum phenyl substituent molar quantity requirement is met in the binder polycarbosilanes. In the above structural units, the Si substituent Ph represents phenyl, and the Si substituents $R^1$, $R^2$, R, R' and R" independently of one another represent hydrogen, alkyl or cycloalkyl. As used herein the term "alkyl" refers to a saturated or unsaturated, straight-chain or branched alkyl radical. Preferred are alkyl radicals having 1 to 6 carbon atoms. Especially preferred alkyl radicals are lower alkyl radicals having 1 to 4 carbon atoms. Examples of alkyl groups within the scope of the invention include methyl, ethyl, propyl, butyl, pentyl, hexyl, octyl, dodecyl, hexadecyl, isopropyl, isobutyl, tertiary-butyl and allyl. As used herein the term "cycloalkyl" includes saturated or unsaturated cycloalkyl radicals. Preferred are $C_5$— or $C_6$-cycloalkyl radicals such as cyclopentyl, cyclohexyl or cyclopentenyl or cyclohexenyl. In the most preferred embodiments of the invention, however, the Si substituents R, R' and R" represent the lower alkyl radical methyl. In the above structural units of the polycarbosilanes, the group A, which with the silicon atoms forms the polycarbosilane backbone, represents a straight-chain or branched alkylene radical having to 6 carbon atoms. Lower alkylene radicals having 1 to 4 carbon atoms, such as, for example, methylene, ethylene, trimethylene and isobutylene, are especially advantageous. In particularly preferred embodiments of the invention, the chain-forming group A represents the lower alkylene radical methylene.

The directly synthesized polycarbosilanes of the binder are those which can be prepared by co-condensation of at least one dihalosilane and at least one dihalohydrocarbon in the presence of an alkali metal according to the process of Sartori et al., U.S. Pat. No. 5,087,685. For this purpose, the dihalosilanes $R^1R^2SiX_2$, $Ph_2SiX_2$, $RR'SiX_2$, $PhR''SiX_2$ (in which Ph, $R^1$, $R^2$, R, R' and R" have the meanings given above and X represents halogen, preferably chlorine or bromine) or mixtures thereof are reacted, in quantities which meet the above conditions with respect to the proportion of the Si phenyl substituents, with at least one dihalohydrocarbon of the formula Y—A—Y (in which A has the meaning given above and Y represents the halogens chlorine, bromine or iodine, preferably chlorine or bromine) in the presence of an alkali metal in an inert organic liquid medium. In general, the reaction is carried out in such a way that first a suspension of the alkali metal is prepared in a suitable solvent, for example in a hydrocarbon such as toluene, xylene or decalin. The other reactants (dihalosilanes, dihalohydrocarbons) are then introduced into the alkali metal suspension. After the reaction has taken place, the polycarbosilane can be isolated from the reaction mixture by any suitable method. If the polycarbosilane is, for example, soluble in the solvent, the other insoluble components can be separated out by filtration. The polycarbosilane remaining in the solvent can then be purified by washing with water and dried by removal of the solvent to give a powder. If, however, the polycarbosilanes formed are insoluble in the solvent, they can be extracted by means of a suitable other solvent, then purified by washing with water and dried by removal of the solvent to give a powder.

In advantageous embodiments of the invention, the polycarbosilanes of the binder have a backbone consisting essentially of the structural units I and II, or of a combination of the structural units I and II with III and/or with IV, or of a combination of the structural units I and III with IV, or of a combination of the structural units I and IV,

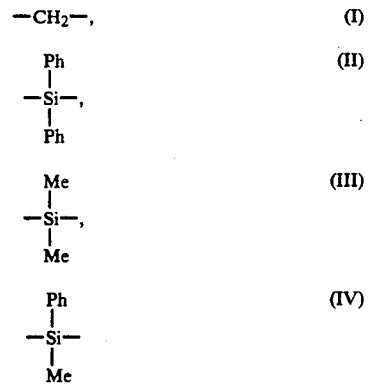

in which the Si substituent Ph represents phenyl, and the Si substituent Me represents methyl. These preferred polycarbosilanes can be built up from alternating structural units of the formulae (I) and (II) and/or (III) or (IV). They can then comprise, for example, chains of —Si(Ph)$_2$—CH$_2$—, —Si(Me)$_2$—CH$_2$— or —Si(Ph)(Me)—CH$_2$— units.

They can also have randomly distributed units of the formulae (I) and (II) and/or (III) or (IV). In that case, they contain blocks of two or more —CH$_2$— groups, two or more —Si(Ph)$_2$— groups, two or more —Si(Me)$_2$— groups, and/or two or more —Si(Ph)(Me)— groups. Furthermore, units with alternating Si—C chains can also be present in such polycarbosilanes, for example —Si(Ph)$_2$—CH$_2$— groups, —Si(Me)$_2$—CH$_2$— groups or —Si(Ph)(Me)—CH$_2$— groups. Binders are particularly preferred whose polycarbosilanes have a backbone consisting essentially of structural units I and II or of a combination of structural unit I with units II and III. Particularly preferred polycarbosilanes include polydiphenylcarbosilane, especially having molecular weights from 700 to 1100 g/mole, preferably from 800 to 1000 g/mole (number average), and poly-(diphenyl-co-dimethyl)-carbosilane, especially with molecular weights from 800 to 1300 g/mole, preferably 900 to 1200 g/mole (number average).

In a second variant (b2) of the invention, the binder contains only directly synthesized polyborocarbosilane or a mixture of directly synthesized polyborocarbosilanes. In a third variant (b1+b2) of the invention, the binder contains both polycarbosilane and polyborocarbosilane. The polyborocarbosilane content in the binder in these second and third variants of the invention is such that the granulated product will have the above-indicated boron content of 0.1 to 3.0% by weight, preferably from 0.2 to 1.0% by weight. In particularly preferred granulated products with polyborocarbosilane-containing binders according to the invention, the binder contains the polyborocarbosilane in such a quantity that the granulated product will have a boron content of from 0.3 to 0.6% by weight. The polyborocarbosilanes contained in the binder in these variants (b2) and/or (b1+b2) of the invention are polymers having a backbone structure consisting of the elements carbon, silicon and boron, the Si groups and hydrocarbon groups being present in the backbone in an alternating distribution or in a random distribution in the same way as in the above polycarbosilanes, but furthermore some of the silicon (Si) atoms in the carbosilane backbone having been replaced by boron (B) atoms. The backbone structure of the polyborocarbosilanes thus consists especially of recurring structural units of the formulae $$-A-, \quad (A)$$

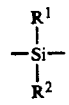   (B)

and

   (C)

in which $R^1$ and $R^2$ independently represent hydrogen, alkyl, cycloalkyl or phenyl (alkyl or cycloalkyl as already defined above), $R^3$ represents a lower alkyl radical having 1 to 4 carbon atoms (lower alkyl as already defined above) or a phenyl radical Ph, and the backbone group A has the same meaning defined above for the alkylene radical A of the polycarbosilane backbones. The molar ratio of the units (A):(B)+(C) is about 1:1. Phenyl (Ph) is the preferred substituent both for the Si substituents and for the B substituents of the polyborocarbosilane. The alkylene radical A in the polyborocarbosilane is preferably the lower alkylene radical methylene. Therefore, the most preferred polyborocarbosilanes are those in which each of the substituents $R^1$, $R^2$ and $R^3$ represents the phenyl radical Ph, and the alkylene radical A represents methylene. These most preferred polyborocarbosilanes are referred to as poly(phenyl-co-diphenyl)-borocarbosilanes. Poly-(phenyl-co-diphenyl)-borocarbosilanes having molecular weights from 500 to 1000 g/mole (number average) are especially preferred.

In polycarbosilanes having a random distribution, there are blocks of 2 or more units of the formula (A), (B) and/or (C). In addition, there are also structural units of the formulae (V) and (VI)

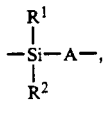   (V)

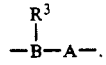   (VI)

Polycarbosilanes of alternating structure comprise structural units of the formulae (V) and (VI).

In the above embodiments of the invention, the proviso that at least 20 mole %, preferably 50 mole % and, in particularly advantageous embodiments, at least 65 mole %, especially at least 70 mole %, of the carbosilane substituents (here based on the total of Si substituents and B substituents) in the binder are phenyl substituents also applies to the variants (b2) and (b1+b2). In addition, the molar ratio of the structural units (B) and (C) or V and VI in the polyborocarbosilanes can vary within a wide range in such a way that the proportion of the boron structural unit of formula (C) or VI in the polyborocarbosilane ranges from small molar proportions, e.g. 0.1 mole %, up to 50 mole %.

In preferred polyborocarbosilanes for the binder the structural units of the formulae (B) and (C) or (V) and (VI) are present in the polyborocarbosilane in a molar ratio from 99:1 to 1:1, particularly in a molar ratio from 19:1 to 1:1.

The polyborocarbosilanes can be obtained analogously to the preparation, described above, of the directly synthesized polycarbosilanes, that is to say analogously to the process of Sartori et al., U.S. Pat. No. 5,087,685. For this purpose, at least one dihalosilane $R^1R^2SiX_2$ ($R^1$, $R^2$ and X having the meanings given above), at least one dihalohydrocarbon of the formula Y—A—Y (A and Y having the meanings given above) and at least one boron dihalide $R^3BZ_2$ (in which $R^3$ has the meaning given above and Z represents the halogens chlorine, bromine or iodine, preferably chlorine or bromine) are reacted with one another in the presence of an alkali metal in an inert organic liquid medium in a co-condensation reaction. The quantities of the dihalosilanes and the boron compound employed on the one hand and the quantity of the dihalohydrocarbons employed on the other hand are preferably such that the overall molar ratio of the sum of the dihalosilanes and boron compound on the one hand to the dihalohydrocarbons on the other hand is about 1:1. The molar ratio of the three reactants dihalosilane, boron compound and dihalohydrocarbon is thus about (2−n):n:2, where n is the molar quantity of the boron compound employed and can assume a value of up to 1. Preferred values for n range from n=0.1 to n=1. Although the ratio of the total of dihalosilane and boron compound, on the one hand, to the dihalohydrocarbon, on the other hand, is preferably about 1:1, deviations of up to 20% are also possible within the scope of the invention. The reaction conditions and the reaction procedure for preparing the polyborocarbosilanes can be directly based on the process of Sartori et al., U.S. Pat. No. 5,087,685 for the preparation of directly synthesized polycarbosilanes. However, additional details regarding the preparation of polyborocarbosilanes can, if desired, also be taken from the pending parallel German Patent Application No. DE 4,102,315.

In the embodiments of the invention in which the granulated silicon carbide powder product contains a polyborocarbosilane-containing binder according to (b2) or (b1+b2), it is not necessary for the product to contain additional sintering aid in order to be suitable for its intended uses. On the other hand, however, granulated products which contain a polyborocarbosilane in the binder according to (b2) or (b1+b2) may optionally contain additional sintering aids. Suitable granulated products free of sintering aid are characterized by a composition of (a) 70 to 95% by weight, preferably 80 to 90% by weight, of SiC powder and (b) 5 to 30% by weight, preferably 10 to 20% by weight, of the binder based on polyborocarbosilane according to (b2) or on mixtures of polycarbosilane according to (b1) and polyborocarbosilane according to (b2).

A polyborocarbosilane preferably present in these granulated products is the poly(phenyl-co-diphenyl)-borocarbosilane already described above.

If, however, binders according to (b1) which do not contain any polyborocarbosilane, are present in the granulated products according to the invention, the granulated products then also advantageously contain an effective amount, for example at least 0.1% by weight, of an oxygen-free sintering aid up to a maximum quantity as indicated above under (c). Particularly preferred granulated products containing sintering aids have a composition of (a) 69.0 to 94.9% by weight, preferably 79.2 to 89.6% by weight, of SiC powder,
(b) 5 to 30% by weight, preferably 10 to 20% by weight, of the binder based on polycarbosilane according to (b1) and
(c) 0.1 to 1.0% by weight, preferably 0.4 to 0.8% by weight, of the sintering aid.

Examples of suitable sintering aids include the known metal carbides such as $Fe_3C$, $MgC_3$, $Li_2C_2$, $Be_2C$ and boron carbide; carbon; metals such as aluminium and boron; boron- and/or aluminium-containing compounds. Examples of boron compounds include boron hydride, trivinylboron and triphenylboron. Examples of aluminium compounds include aluminium nitride and aluminium diboride. Mixtures of the sintering aids can also be used. Other analogous metal-containing sintering aids may also be present in the granulated products of the invention, but oxygen-containing or oxidic sintering aids are not used within the scope of the present invention. Preferred sintering aids are selected from the group consisting of carbon, boron, aluminium and boron carbide, in particular from the group consisting of boron and boron carbide.

The granulated products based on silicon carbide powder according to the invention can be prepared in a simple manner by mixing the constituents of the granulated product (a) SiC powder, (b) polycarbosilane binder and, optionally, (c) sintering aid in an organic solvent, preferably in chloroform, toluene or xylene, optionally with the addition of a dispersing aid, homogenizing the resulting mixture, and finally removing the solvent by evaporation and simultaneous rolling motion or by spray-drying to form the granulated product. To produce the granulated product, a slip with a solids content of, for example, from up to 40% by weight and more, up to 70% by weight, is first prepared. For this purpose, the binder is dissolved in the organic solvent, and the silicon carbide powder and, if desired, the sintering aid is/are then dispersed in the binder solution. The dispersion can be assisted, if desired, by use of known dispersing aids. Examples of suitable dispersing aids include those based on alkali-free ethylene oxide adducts which are particularly suitable for special ceramic particles such as, for example, SiC particles which are dispersed in anhydrous systems. The optimum quantity to be added, in the range from 0.5 to 2.5% by weight (relative to the total composition), can easily be determined by a person skilled in the art by means of a few comparative tests. Further suitable dispersing aids are polymeric dispersing aids with anchoring groups which can be absorbed by the surface of the ceramic particles, and with an organic polymer chain of relatively high molecular weight. As a result of varying the chemical structure of the polymer chain, a range of this type of polymeric dispersants (for example polymeric dispersants made by ICI under the name "Hypermer") is available in the state of the art and enables a person skilled in the art simply to select, for the preparation of a SiC granulated product, a dispersant matched to the polarity of the solvent used.

After dispersion, the slip can be homogenized in a known manner, for example by conventional wet-grinding processes. For example, homogenizers with high-speed rotors, ball mills, stirred mills or colloid mills can be used for the homogenization. Ball mills are preferably used. The slip is generally subjected to homogenization for a period of up to 24 hours, preferably 2 to 24 hours.

Finally, the solvent is removed, the granulated product being formed. For this purpose, the solvent can be distilled off under normal or reduced pressure, for example in a rotary evaporator. If the preparation of the granulated product is carried out in a rotary evaporator, it is advantageous to distill off the solvent at temperatures of about 20° C. and at reduced pressure. Preferably, the temperature and pressure are regulated such that there is no boiling of the solvent, or at most gentle boiling. The residue remaining in the rotary evaporator is then adjusted by means of granulation screens to the desired particle diameter, for example a particle diameter of <0.6 mm, preferably <0.3 mm.

In a further, preferred variant of the invention, the slip is converted by spray-drying into the granulated product. The spray-drying can here be carried out in conventional spray-driers. The drying conditions are adjusted especially such that that the inlet temperature of the drying air is about 75° to 90° C., and the outlet temperature is about 45° to 60° C. The throughput (spray flow) is adjusted in particular to the range from 400 to 800 liters (at S.T.P.) per hour. SiC granulated products are obtained which after the spray-drying have a residual moisture content of less than 2% by weight.

According to another preferred variant, the granulated product is produced by the pelletization method. In this process, the SiC powder is introduced first, and the polycarbosilane or polyborocarbosilane dissolved in a solvent, for example chloroform, toluene or xylene, is sprayed on. The resulting preparation is then rolled, for example on a rolling disc, to give a granulated product of the desired size, and the solvent is removed.

A further method which is readily applicable is to dry in a fluidized bed. In this case, the procedure is preferably such that a small quantity of granulated product is first introduced as a nucleating agent, and a dispersion comprising SiC powder, polycarbosilane, optionally sintering aid, and solvent or dispersant is sprayed onto the granulated product held in the fluidized bed. The drying conditions correspond to those of spray-drying.

The granulated silicon carbide products obtained by the above processes are directly suitable for further use. The granulated silicon carbide products according to the invention are outstandingly suitable, for example, for many applications in the field of high-performance ceramics, for example as a material for the manufacture of ceramic moldings, for coatings, for composites or as joining agents (adhesives), that is to say for bonding (joining) ceramic moldings especially of silicon carbide. The granulated product according to the invention is, for example, also suitable as an injection-moldable granulated silicon carbide product for the manufacture of ceramic moldings by injection-molding processes. The granulated silicon carbide product according to the invention is very particularly suitable as a granulated SiC product ready for pressing for pressureless manufacture of sintered monoliths, particularly in the field of high-performance sintered pressureless ceramics. The invention also relates to these pressurelessly sintered silicon carbide ceramics. They are characterized in particular by a microstructure which is a globular structure having a porosity rate from 0 to 2% and a $d_{arith.}=5$ to 10 μm. In another variant of the silicon carbide ceramics, sintered pressureless, according to the invention, these have a four-point bending strength of at least 420 MPa and a Weibull modulus of at least 6, preferably of at least 10. In a further variant of the pressurelessly sintered silicon carbide ceramics according to the invention, the ceramics have a four-point bending strength of at least 350 MPa and a Weibull modulus of at least 10, preferably of at least 14. Of the two above SiC ceramic variants according to the invention which are characterized by a particular four-point bending strength and a particular Weibull modulus, those embodiments are particularly preferred which additionally have the microstructure indicated above. Particularly preferred embodiments of the above variants of the pressurelessly sintered silicon carbide ceramics are further characterized by a $K_{Ic}$ factor (=fracture toughness) of at least 3.2 MPam$^{\frac{1}{2}}$, preferably a $K_{Ic}$ factor of at least 4.2 MPam$^{\frac{1}{2}}$.

The above sintered pressureless ceramics can be produced from the aforedescribed granulated silicon carbide product according to the invention in a simple manner by known state of the art processes. The advantageous properties of the granulated silicon carbide products according to the invention thus enable manufacture of pressurelessly sintered silicon carbide ceramics, which have hitherto not been known in the state of the art, these novel silicon carbide ceramics being each distinguished by the characteristics given above and especially being highly dense ceramics having high strengths.

To produce the pressurelessly sintered silicon carbide ceramics according to the invention, a green compact is first prepared from the granulated silicon carbide product according to the invention. The preparation of the green compact, in which the granulated SiC product is already converted into a desired form, is carried out under pressure, for example at pressures of up to about 300 MPa. Both hot-pressing processes and cold-pressing processes are suitable for this purpose. In the preferred cold-pressing process, the temperatures applied are usually from room temperature up to at most about 70° C. In hot-pressing, the granulated silicon carbide product is converted under pressure and at a temperature of up to about 500° C. into the desired form. The prepared green compacts have sufficient strength that they can also be subjected, before sintering, to additional working steps or shaping operations. Polycarbosilanes which are solid or hard at ambient temperature can be shaped by working them in the cold state in a hot machine or mold. Alternatively, they can be heated to a temperature at which they can be shaped, and worked in a cold or hot machine or mold. Such polycarbosilanes resolidify on cooling and are therefore dimensionally very stable.

Polycarbosilanes which are capable of being formed even at ambient temperature can be worked at ambient temperature.

The green compacts can be shaped by known state of the art methods, for example by molding, uniaxial pressing, isopressing, extrusion, injection molding, and the like. The shaped green compacts can, if desired, be subjected to further shaping. The green compacts are pyrolyzed by a subsequent treatment at elevated temperatures and then converted by a second treatment at elevated temperatures by pressureless sintering into the silicon carbide ceramic according to the invention. The pressureless sintering is carried out especially at temperatures between 2000° C. and about 2100° C. The densities of the resulting pressurelessly sintered silicon carbide ceramics reach values which are very close to the theoretical density (TD) of silicon carbide. In particular, densities are obtained which are above 90% and especially above 95% of the theoretical density of silicon carbide. The granulated SiC products described above, which were produced by a spray-drying process, are particularly suitable for the manufacture of the ceramics according to the invention.

The invention provides novel, advantageous granulated silicon carbide products which represent an ideal starting material for manufacturing silicon carbide-based ceramic products. Especially by means of the binder used in the granulated SiC product according to the invention, it can be ensured that, if desired, SiC ceramics with a high proportion of α-SiC, for example with about 70% by weight and more, become accessible, since hardly any β-SiC is formed in the pyrolytic conversion of the binder into silicon carbide. The provision of the granulated silicon carbide product according to the invention also permits for the first time the manufacture of novel pressurelessly sintered silicon carbide ceramics, whose properties are superior to those of the pressurelessly sintered silicon carbide ceramics, which have hitherto been available in the state of the art.

The following examples are intended to illustrate the invention in further detail without, however, restricting the scope thereof.

Silicon carbide and binders having the following properties were used in the examples.

α-SiC: Preparation by the Acheson process; ultrafine, highly pure with a specific surface area (BET) of $15 \pm 1$ m$^2$/g; a particle size distribution of 90% by weight $<1.8$ μm and 50% by weight $<0.7$ μm (Sedigraph) or 90% by weight $<1.7$ μm, 50% by weight $<0.8$ μm and 20% by weight $<0.5$ μm (microtrack-/laser); a tap density of 0.75 to 1.0 g/cm$^3$; a pH value of 6 to 7 (boiling of 90 g of SiC in 100 ml of deionized water; measurement after cooling to room temperature).

Binders (each prepared with the use of sodium):
Directly synthesized polydiphenylcarbosilane (from 1:1 diphenyldichlorosilane and methylene bromide in xylene); molecular weight about $860 \pm 60$ g/mole (number average); the elemental analysis gave about 79.61% C, 6.14% H and 14.2% Si.

Directly synthesized poly-(diphenyl-co-dimethyl)-carbosilane (from diphenyldichlorosilane, dimethyldichlorosilane and methylene bromide in a molar ratio of 1:1:2 in xylene); molecular weight about $1080 \pm 90$ g/mole (number average); the elemental analysis gave about 71.2% C, 7.09% H and 21.12% Si.

Directly synthesized poly-(phenyl-co-diphenyl)-borocarbosilane (from diphenyldichlorosilane, phenylboron dichloride and methylene bromide in a molar ratio of 1:1:2 in xylene); blackish brown highly viscous product; the elemental analysis gave about 10% Si, 75.9% C, 6.2% H and 2.5% B; molecular weight about 648 g/mole.

Directly synthesized poly-(diphenyl-co-dimethyl)-carbosilane (from diphenyldichlorosilane, dimethyldichlorosilane and methylene bromide in a molar ratio of 4:1:5 in xylene); molecular weight about $880 \pm 70$ g/mole (number average); the elemental analysis gave about 76.4% C, 15.2% Si and 6.6% H.

EXAMPLE 1

A. Granulated silicon carbide product

Slip composition (relative to the dry matter):

| | | |
|---|---|---|
| silicon carbide | ultrafine α-SiC (15 m²/g) | 79.4% by weight |
| binder | polydiphenylcarbosilane | 15.0% by weight |
| | poly-(diphenyl-co-dimethyl)-carbosilane 1:1:2 | 5.0% by weight |
| sintering aid | boron (elemental) | 0.6% by weight |

Slip preparation:
dissolving of the binder in chloroform
dispersing of the SiC powder and of the sintering aid in the solution
homogenizing of the batch in a ball mill (20 hours' mixing time)
solids content of the slip 40% by weight
Preparation of granulated product:
removal of the solvent in a rotary evaporator at T=20° C. and p=200 mbar
residual moisture content <1%
granulation by comminution in a mortar and screening of the residue down to a particle diameter of <0.3 mm

B. Silicon carbide ceramic

Shaping by uniaxial pressing:

(Preparation of specimen bars having dimensions of 56 mm × 5 mm × 7 mm)

| | |
|---|---|
| mold temperature: | 70° C. |
| pressing steps: | |
| 1st and 2nd pressing steps | 200 MPa, 1 min holding time; |
| 3rd pressing step | 300 MPa, 1 min holding time; |
| properties of the green compacts density: | 68% of theoretical density (TD) |

First temperature treatment (pyrolysis):

| | |
|---|---|
| heating rate | 100° C./hour |
| end temperature | 1450° C. |
| holding time at end temperature | 1 hour |
| gas atmosphere | Ar, $N_2$ |
| cooling rate | 250° C./hour |
| properties of the pyrolyzed moldings | |
| density | 60% TD |
| ceramic yield of the binder | 17% |

Second temperature treatment (pressureless sintering):

| | |
|---|---|
| end temperature | 2080° C. |
| holding time at end temperature | 1 hour |
| gas atmosphere | Ar, $N_2$ |
| properties of the molding sintered pressureless | |
| density | 98% TD |
| modulus of elasticity | 426 GPa |
| 4-point bending strength | 360 MPa |
| (at room temperature according to DIN 51110, Part 1) | |
| Weibull modulus | 14 |

EXAMPLE 2

A. Granulated silicon carbide product

Slip composition:

| | | |
|---|---|---|
| silicon carbide | ultrafine α-SiC (15 m²/g) | 80.0% by weight |
| binder | poly-(phenyl-co-diphenyl)-borocarbosilane | 20.0% by weight |
| sintering aid | — | — |

Slip preparation:
solids content of the slip 40% by weight
dissolving of the binder in chloroform
dispersing of the SiC powder in the solution
homogenizing of the batch in a ball mill (20 hours' mixing time)
Preparation of the granulated product:
removal of the solvent in a rotary evaporator at T=20° C. and p=200 mbar
residual moisture content <1%
granulation by comminution in a mortar and screening of the residue down to a particle diameter of <0.3 mm

B. Silicon carbide ceramic

Shaping by unaxial pressing:

(Preparation of specimen bars having dimensions of 56 mm × 5 mm × 7 mm)

| | |
|---|---|
| mold temperature: | 70° C. |
| pressing steps: | |
| 1st and 2nd pressing step | 200 MPa, 1 min holding time; |
| 3rd pressing step | 300 MPa, 1 min holding time; |
| properties of the green compacts density: | 70% of theoretical density (TD) |

First temperature treatment (pyrolysis):

| | |
|---|---|
| heating rate | 100° C./hour |
| end temperature | 1450° C. |
| holding time at end temperature | 1 hour |
| gas atmosphere | Ar, $N_2$ |
| cooling rate | 250° C./h |
| properties of the pyrolyzed moldings | |
| density | 61% TD |
| ceramic yield of the binder | 15% |

Second temperature treatment (pressureless sintering):

| | |
|---|---|
| end temperature | 2080° C. |
| holding time at end temperature | 1 hour |
| gas atmosphere | Ar, $N_2$ |
| properties of the molding sintered pressureless | |
| density | 99% TD |
| modulus of elasticity | 431 GPa |
| 4-point bending strength | 347 MPa |
| (according to DIN 51110, Part 1, at room temperature) | |
| Weibull modulus | 6 |

Microstructure:
globular structure
porosity rate from 0 to 2%
$d_{arith.}$ = 5 to 10 μm

EXAMPLE 3

A. Granulated silicon carbide product

Slip composition

| silicon carbide | ultrafine α-SiC (15 m²/g) | 79.4% by weight |
|---|---|---|
| binder | polydiphenyl-carbosilane | 20.0% by weight |
| sintering aid | boron (elemental) | 0.6% by weight |

Slip preparation:
solids content of the slip 30 to 40% by weight
dissolving of the binder in chloroform
dispersing of the SiC powder and the sintering aid in the solution
homogenizing of the batch in a ball mill (20 hours' mixing time)
Preparation of the granulated product by spray-drying:

| parameter adjustment on the spray dryer (Buechi Minispray) | |
|---|---|
| inlet temperature | 75 to 90° C. |
| outlet temperature | 45 to 60° C. |
| spray flow | 400 to 8000 liters (S.T.P.)/hour |
| aspirator setting | 7 to 20 |
| pump setting | 5 to 15 |
| residual moisture of granulated product | <2% by weight |

B. Silicon carbide ceramic

Shaping by uniaxial pressing:

| (Preparation of specimen bars having dimensions of 56 mm × 5 mm × 7 mm) | |
|---|---|
| mold temperature: | 20° C. |
| pressing steps: | |
| 1st and 2nd pressing step | 200 MPa, 1 min holding time; |
| 3rd pressing step | 300 MPa, 1 min holding time; |
| properties of the green compacts density: | 62% of theoretical density (TD) |

First temperature treatment (pyrolysis):

| heating rate | 100° C./hour |
|---|---|
| end temperature | 1450° C. |
| holding time at end temperature | 1 hour |
| gas atmosphere | Ar, N₂ |
| cooling rate | 250° C./hour |
| properties of the pyrolyzed moldings | |
| density | 54% TD |
| ceramic yield of the binder | 16% |

Second temperature treatment (pressureless sintering):

| end temperature | 2080° C. |
|---|---|
| holding time at end temperature | 1 hour |
| gas atmosphere | Ar, N₂ |
| properties of the molding sintered pressureless | |
| density | 97% TD |
| modulus of elasticity | 414 GPa |
| 4-point bending strength | 435 MPa |
| (at room temperature according to DIN 51110, Part 1) | |
| Weibull modulus | 8 |

EXAMPLE 4

A. Granulated silicon carbide product

Example 3 was repeated, using 4:1:5 poly(diphenyl-co-dimethyl)-carbosilane.

B. Silicon carbide ceramic

The molding and temperature treatment were carried out as in Example 3B.

| Weibull modulus: | 21 |
|---|---|
| 4-point bending strength: | 370 MPa |

EXAMPLE 5

Preparation of the granulated product in a fluidized bed

A dispersion of 2.95 kg of directly synthesized polydiphenylcarbosilane, 11.65 kg of SiC (product UF 15 TM, made by Lonza) and 0.112 kg of boron carbide B₄C in 10.30 kg of xylene was first produced.

0.618 kg of granulated product was introduced as a nucleating agent into a fluidized-bed drier, and the dispersion was sprayed in.

The inlet temperature of the drying air was about 90° C., the outlet temperature was 55° C., and the product temperature was about 65° C.

6.7 kg of condensate, 10.3 kg of granulated product and 1.85 kg of filter dust were obtained.

The residual moisture content was 0.2% after drying with fresh air and 0.4% after circulation drying, relative to granulated product.

The screen analysis gave the following values:

| >630 μm | 1.1% |
|---|---|
| 630–400 μm | 6.1% |
| 400–200 μm | 36.2% |
| 200–90 μm | 31.9% |
| <90 μm | 24.8% |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A granulated silicon carbide powder product consisting essentially of the following homogeneously distributed constituents:
   (a) 67 to 95% by weight SiC powder,
   (b) 3 to 30% by weight binder composed of at least one binder ingredient selected from the group consisting of
      (b1) a directly synthesized polycarbosilane or polycarbosilane mixture and
      (b2) a directly synthesized polyborocarbosilane or polyborocarbosilane mixture,
      wherein at least 20 mole % of the carbosilane substituents in the binder are phenyl substituents and, if the binder contains polyborocarbosilane, the proportion of the polyborocarbosilane is such that the boron content of the granulated product is 0.1 to 3.0% by weight, and
(c) from 0 to 3.0% by weight of an oxygen-free sintering aid.

2. A granulated product according to claim 1, wherein said binder contains polyborocarbosilane in an amount such that the granulated product has a boron content of 0.2 to 1.0% by weight.

3. A granulated product according to claim 1, characterized in that the particles of the granulated product have a particle diameter of less than 0.6 mm.

4. A granulated product according to claim 1, wherein the SiC powder consists essentially of $\alpha$-SiC.

5. A granulated product according to claim 4, wherein the $\alpha$-SiC powder has a specific surface area of 10 to 20 m²/g, measured according to BET.

6. A granulated product according to claim 1, wherein at least 65 mole % of the carbosilane substituents in the binder are phenyl substituents.

7. A granulated product according to claim 6, wherein at least 70 mole % of the carbosilane substituents in the binder are phenyl substituents.

8. A granulated product according to claim 1, wherein the polycarbosilanes of the binder have a backbone consisting essentially of structural units of the formulae

—A—,  (A)

and

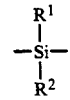  (B)

in which
R¹ and R² are independently selected from the group consisting of hydrogen, alkyl, cycloalkyl and phenyl, and A represents an alkylene radical having 1 to 6 carbon atoms, and wherein the structural units of the formulae (A) and (B) are present in the polycarbosilane in a ratio of about 1:1.

9. A granulated product according to claim 1, wherein the polycarbosilanes of the binder have a backbone consisting essentially of a combination of the structural units I and II, of a combination of the structural unit I with II and with III and/or IV, of a combination of the structural units I and III with IV or of a combination of the structural unit I and the structural unit IV

—CH₂—,  (I)

  (II)

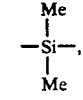  (III)

  (IV)

in which the Si substituent Ph represents phenyl, and the Si substituent Me represents methyl, and wherein the ratio of the number of structural units (I) to the sum of the numbers of structural units (II), (III) and (IV) is about 1:1.

10. A granulated product according to claim 9, wherein the polycarbosilanes of the binder have a backbone consisting essentially of a combination of the structural units I and II or of a combination of the structural units I and II with III.

11. A granulated product according to claim 10, wherein the polycarbosilane having the backbone consisting of the combination of the structural units I and II is a polydiphenylcarbosilane and the polycarbosilane having the backbone consisting of the combination of the structural units I and II with III is a poly(diphenyl-co-dimethyl)-carbosilane.

12. A granulated product according to claim 1, wherein the polyborocarbosilanes of the binder have a backbone consisting essentially of structural units of the formulae

—A—,  (A)

  (B)

and

  (C)

in which R¹ and R² are independently selected from the group consisting of hydrogen, alkyl, cycloalkyl and phenyl, R³ represents a lower alkyl radical having 1 to 4 carbon atoms or phenyl, and A represents an alkylene radical having 1 to 6 carbon atoms, and wherein the ratio of the number of structural units (A) to the sum of the numbers of structural units (B) and (C) is about 1:1.

13. A granulated product according to claim 12, wherein A represents a —CH₂— group.

14. A granulated product according to claim 12, wherein the polyborocarbosilane is a poly-(phenyl-co-diphenyl)-borocarbosilane.

15. A granulated product according to claim 1, consisting essentially of
(a) 70 to 95% by weight of SiC powder, and
(b) 5 to 30% by weight of the binder based on polyborocarbosilane according to (b2) or on mixtures of polycarbosilane according to (b1) and polyborocarbosilane according to (b2).

16. A granulated product according to claim 15, consisting essentially of
(a) 80 to 90% by weight of SiC powder and
(b) 1? to 20% by weight of the binder based on polyborocarbosilane according to (b2) or on mixtures of polycarbosilane according to (b1) and polyborocarbosilane according to (b2).

17. A granulated product according to claim 1, consisting essentially of
(a) 69.0 to 94.9% by weight of SiC powder,
(b) 5 to 30% by weight of the binder based on polycarbosilane according to (b1), and
(c) 0.1 to 1.0% by weight of oxygen-free sintering aid.

18. A granulated product according to claim 17, consisting essentially of (a) 79.2 to 89.6% by weight of SiC powder,
(b) 10 to 20% by weight of the binder based on polycarbosilane according to (b1), and
(c) 0.4 to 0.8% by weight of oxygen-free sintering aid.

19. A granulated product according to claim 1, wherein the sintering aid is a boron-containing sintering aid selected from the group consisting of elemental boron and boron carbide.

20. A granulated product according to claim 19, wherein said sintering aid is boron carbide.

21. A process for preparing a granulated product consisting essentially of the following homogeneously distributed constituents:
(a) 67 to 95% by weight SiC powder,
(b) 3 to 30% by weight binder composed of at least one binder ingredient selected from the group consisting of
 (b1) a directly synthesized polycarbosilane or polycarbosilane mixture, and
 (b2) a directly synthesized polyborocarbosilane or polyborocarbosilane mixture,
wherein at least 20 mole % of the carbosilane substituents in the binder are phenyl substituents and, if the binder contains polyborocarbosilane, the proportion of the polyborocarbosilane is such that the boron content of the granulated product is 0.1 to 3.0% by weight, and
(c) from 0 to 3.0% by weight of an oxygen-free sintering aid,
said process comprising the steps of:
mixing the constituents of the granulated product
 (a) SiC powder, and
 (b) polycarbosilane binder
in an organic solvent with the addition of a dispersing aid;
homogenizing the resulting mixture; and
removing the solvent to form a granulated product.

22. A process according to claim 21, wherein the solvent removing step is effected by evaporation with simultaneous rolling motion, pelletization and fluidized-bed drying.

23. A process according to claim 21, wherein the solvent removing step is effected by spray-drying.

24. A process according to claim 21, wherein
 (c) an oxygen-free sintering aid is also mixed with said SiC powder and said polycarbosilane binder in said organic solvent.

25. A process according to claim 21, wherein said organic solvent is selected from the group consisting of chloroform, toluene and xylene.

* * * * *